United States Patent [19]

Lanese et al.

[11] Patent Number: 4,743,803
[45] Date of Patent: May 10, 1988

[54] GENERAL SERVICE TUNGSTEN-HALOGEN INCANDESCENT LAMP HAVING IMPROVED FILAMENT SHOCK RESISTANCE

[75] Inventors: Robert M. Lanese, Cleveland Heights; Dean R. Tener, Cuyahoga Falls; Charles F. Hickey, III; Nicholas E. Korenowski, both of Euclid, all of Ohio

[73] Assignee: General Electric Company, Schenectady, N.Y.

[21] Appl. No.: 50,271

[22] Filed: May 15, 1987

[51] Int. Cl.$^4$ .............................................. H01K 1/18
[52] U.S. Cl. .................................... 313/579; 313/25; 313/331; 313/318
[58] Field of Search .................. 313/17, 25, 579, 574, 313/580, 331, 315, 317, 318

[56] References Cited

U.S. PATENT DOCUMENTS

| | | | |
|---|---|---|---|
| 4,138,623 | 2/1979 | McMillan | 313/331 |
| 4,647,809 | 3/1987 | Blaisdell et al. | 313/25 |
| 4,658,177 | 4/1987 | Gosslar et al. | 313/25 |
| 4,673,840 | 6/1987 | Gates | 313/579 X |

Primary Examiner—David K. Moore
Assistant Examiner—K. Wieder
Attorney, Agent, or Firm—John P. McMahon; Philip L. Schlamp; Fred Jacob

[57] ABSTRACT

A mounting arrangement for disposing a light source comprising an inner envelope within an outer envelope with both envelopes comprising a general service tungsten-halogen incandescent lamp is disclosed. The mounting arrangement has parameters which are selected in accordance with the ratio between the natural frequency characteristics of the filament of the light source and the mounting arrangement itself. The selected ratios of the natural frequencies of the filament and the mounting arrangement reduce the typically experienced shock vibrations of the general service lamp that are transmitted to the filament and thereby improves the overall life expectancy of the general service incandescent lamp.

15 Claims, 9 Drawing Sheets

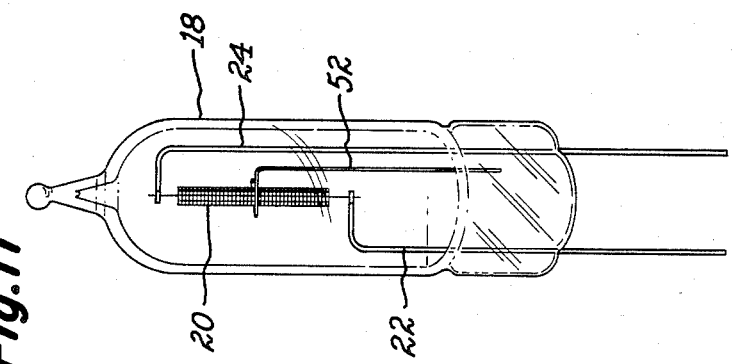
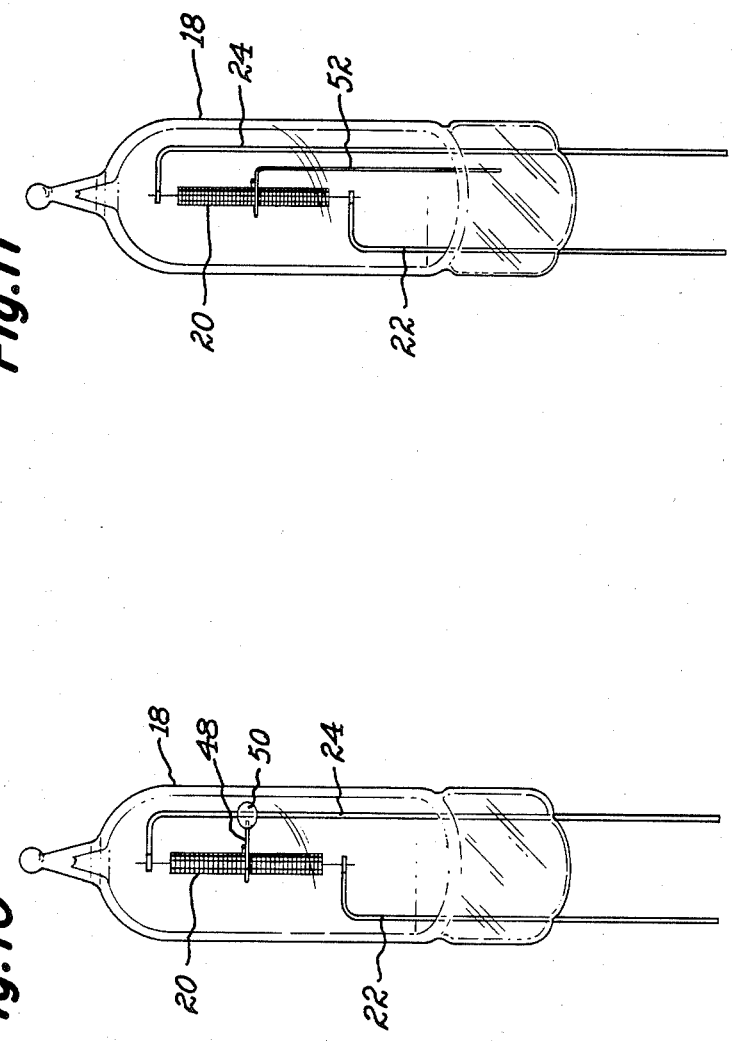

GENERAL SERVICE TUNGSTEN-HALOGEN INCANDESCENT LAMP HAVING IMPROVED FILAMENT SHOCK RESISTANCE

BACKGROUND OF THE INVENTION

This invention relates to a general service tungsten-halogen incandescent lamp, and more particularly, to a mounting arrangement for the inner envelope of the tungsten-halogen incandescent lamp which improves the shock resistance of an operating filament housed within the inner envelope.

Recent improvements to the incandescent art have provided a general service lamp having an inner envelope disposed within an outer envelope which contains a halogen compound, houses a tungsten filament and serves as a light source for the lamp. One such lamp is described in U.S. Pat. No. 4,647,809 of Blaisdell et al. issued 3/3/87.

The operating tungsten filament of the lamp is prone to hot shock type failures which may typically occur when a mechanical shock or impact of a sufficient amount is imparted to the outside of the lamp while the lamp is illuminating, causing the hot operating filament to oscillate a sufficient amount so as to possibly contact one of the two inner leads between which the filament is connected. If the oscillating filament does contact the related inner lead, then the filament is electrically shorted and fails. Due to the relatively close environment within the inner envelope a sufficient amount of spacing between the inner leads and the axially aligned operating filament cannot be provided so as to completely eliminate the possible occurrence of this hot shock problem. It is desired that an arrangement of a general service tungsten-halogen lamp for mounting the inner envelope which houses the filament be provided to reduce or even eliminate the hot shock problem associated with the hot operating filament. Alternately, it is desired that means be provided within structure of the inner envelope itself to solve the hot shock problem. Still further, it is desired that a combination of the mounting means and inner envelope means be provided to eliminate the hot shock problem.

Accordingly, one object of the present invention is to provide a general service tungsten-halogen incandescent lamp with a mounting arrangement or means which reduces or even eliminates hot shock filament failures.

It is another object of the present invention to provide an inner envelope for a general service tungsten-halogen lamp having means to correct for the hot shock filament failures.

It is further object of the present invention to provide a combination of a mounting means and means within an inner envelope to correct for the hot shock filament failures.

SUMMARY OF THE INVENTION

The present invention is directed to a general service tungsten-halogen incandescent lamp having an improved mounting means or means within the inner envelope of the lamp which reduces the typically experienced filament hot shock failures.

The general service tungsten-halogen incandescent lamp comprises an electrically conductive base, an outer envelope formed of a light-transmissive material, and an inner envelope containing a fill of a halide compound and housing an axially aligned tungsten filament. The tungsten filament is capable of being effective when operative so as to have a predetermined range of characteristic natural frequencies $\Omega_z$. The filament is connected between a pair of inner leads which extend out of one end of the inner envelope. Means are provided for electrically connecting the pair of inner leads to the electrically conductive base. Mounting means, also forming part of the means for electrically connecting the pair of inner leads, is provided which dispose the inner envelope within the outer envelope and has a predetermined range of characteristic natural frequencies $\Omega_y$. The characteristic natural frequencies $\Omega_z$ of the operative filament and the characteristic natural frequencies $\Omega_y$ of the mounting means are interrelated by the following relationship;

A ratio of $\Omega_z/\Omega_y$ having a low range from about 0.0 to about 0.3 and high range from greater than about 1.4.

BRIEF DESCRIPTION OF THE DRAWING

FIG. 10 shows one embodiment of the present invention for supporting the filament within the inner envelope.

FIG. 11 shows another embodiment of the present invention for supporting the filament within the inner envelope.

DETAILED DESCRIPTION OF THE PREFERRED EMBODIMENTS

Figure 1:
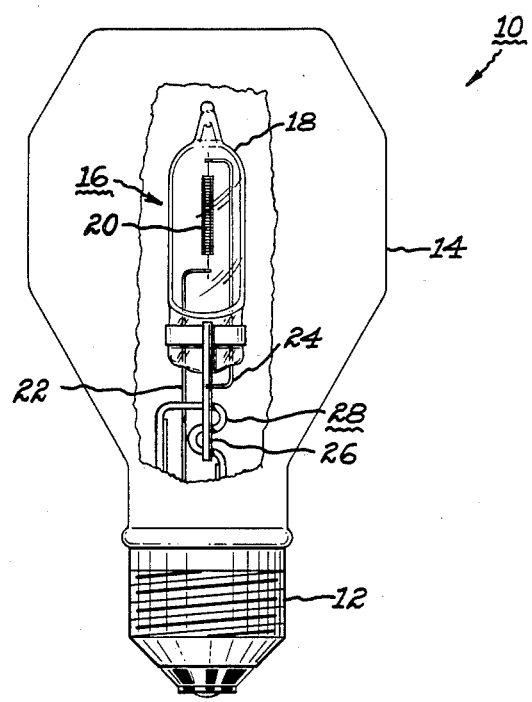
FIG. 1 illustrates a general service tungsten-halogen incandescent lamp partially cut away to show the mounting of the light source within the outer envelope.
Figure 2:
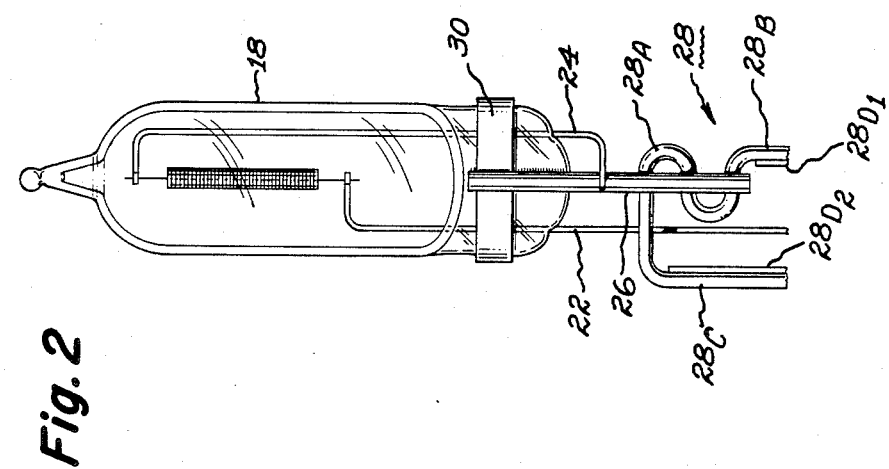
FIG. 2 illustrates the connection of the inner envelope to the mounting means of the present invention.

FIG. 1 illustrates a general service tungsten-halogen incandescent lamp 10 in accordance with the present invention. The tungsten-halogen lamp 10 comprises an electrically conductive base 12, an outer envelope 14 formed of a light-transmissive material and a light source 16 comprising an inner envelope 18 containing a fill of a halogen compound and housing an axially aligned preferably coiled-coil tungsten filament 20 having a wide range of wattage ratings which, as will be described, is capable of being effective when operative to have a predetermined range of characteristic natural frequencies $\Omega_z$. The filament 20 is connected between inner leads 22 and 24. The inner leads 22 and 24 enter into the bottom portion or pinch portion of the inner envelope 18 and are connected across the tungsten filament 20. The inner lead 22 extends downward without contacting a mounting arrangement or means 28 and has a lower end portion which is appropriately and electrically connected to base 12. The inner lead 24 is connected to a post member 26, which, in turn, is connected to the mounting assembly 28 shown in detail in FIG. 2.

The mounting assembly 28 has an upper portion with a loop section $28_A$ electrically connected to the post member 26. The loop section $28_A$ is formed with a leg portion $28_B$, partially shown, which has means at its lower end for appropriately connecting to the electrically conductive base 12. The mounting assembly further comprises another leg portion $28_C$, partially shown, having means at its lower end for appropriately connecting to the lamp 10. Each of the legs $28_B$ and $28_C$ have an additional member $28_D$ which advantageously increase the stiffness of mounting means 28 in a manner to be described hereinafter.

The post member 26 is connected to the outer surface of the clamp arrangement 30 by appropriate means such as welding. The clamp 30 is wrapped around and fastened to the pinched portion of the inner envelope 18. The post 26 being connected to the clamp 30 provides the structure support between the mounting means 28 and the inner envelope 18.

Figure 3:
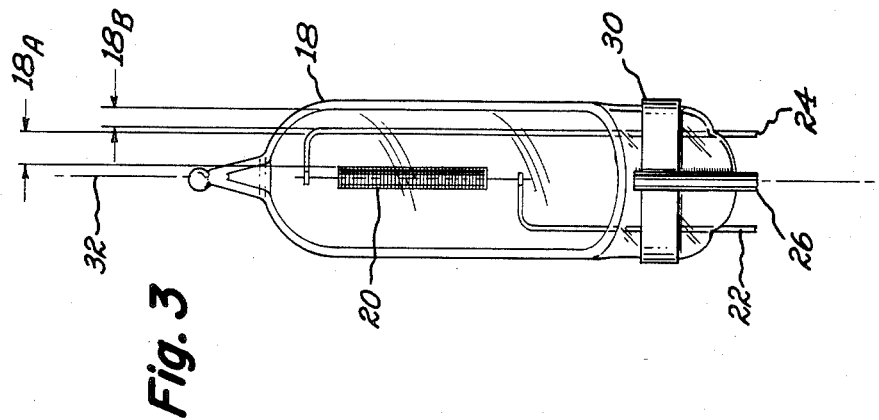
FIG. 3 illustrates, in a slightly enlarged manner, the parameters associated with axially aligning the filament within the inner envelope.

The relatively compact inner envelope 18, shown in FIG. 3, provides a relatively close environment for the filament 20 having its mid-portion approximately axially aligned along the centerline 32 of lamp 10 and connected between inner leads 22 and 24. The spacing between the inner most portion of filament 20 and the inner most portion of the relatively long inner lead portion 24 is shown as a distance $18_A$. Similarly, the spacing between the inner most portion of the inner lead 24 and its related wall of the envelope 18 is shown as a distance $18_B$. These distances $18_A$ and $18_b$ have respectively typical values of about 3 mm and 1 mm.

As discussed in the "Background" section, the relatively small environment of the inner envelope provided for the tungsten filament creates a problem associated with the previously discussed hot shock filament failures of the general service incandescent lamp 10. During our investigation to solve the hot shock problem a typical lamp 10, not having the benefits of the present invention, was placed into a Drop Tester apparatus, oriented in a horizontal manner and illuminated. The typical lamp when subjected to being dropped by a distance of about one-half (½) inch caused the illuminated filament to have an amplitude of oscillation of about 3 mm to about 6 mm which was a sufficient amount to allow the hot filament to contact its related inner lead and thereby causing the failure thereof.

The present invention solves such a hot shock problems by selecting a ratio of the natural frequencies of the hot, operating filament 20 relative to the natural frequencies of the mounting means 28.

The term "natural frequency" sometimes termed "natural frequency of oscillation" as used herein is represented by the following expression;

$$w = \sqrt{k/m}$$

where k is a constant primarily dependent on the stiffness characteristic of the related material; and m is the mass of the related material.

The natural frequencies of the hot operating filaments related to this invention were determined by arranging a typical lamp 10 in a horizontal manner in a Vibration apparatus having means for controlling the frequency of vibration. The vibration frequency, given in Hz, was varied while a hot operating filament designed to operate at 120 V. a-c, was being observed. When the vibrating frequency reached about 35 Hz, the amplitude of oscillation of the hot filament was observed to reach is maximum value which is typically termed its resonance. A frequency range of about 30 Hz to about 40 Hz to cover the herein term natural frequencies $\Omega_z$ of the hot operating filaments of related lamps is contemplated by the practice of this invention.

The natural frequency of any of the mounting means contemplated by the invention may be determined in a manner similar to that described for the hot operating filament. The natural frequencies of the mounting means is herein termed $\Omega_y$ and its frequencies contemplated by the practice of this invention have a low range from about 0 to about 23 Hz and a high range from about 70 to infinity. The natural frequency of the mounting means is selected relative to the natural frequency of the hot filament to provide a desired ratio therebetween.

Figure 4:
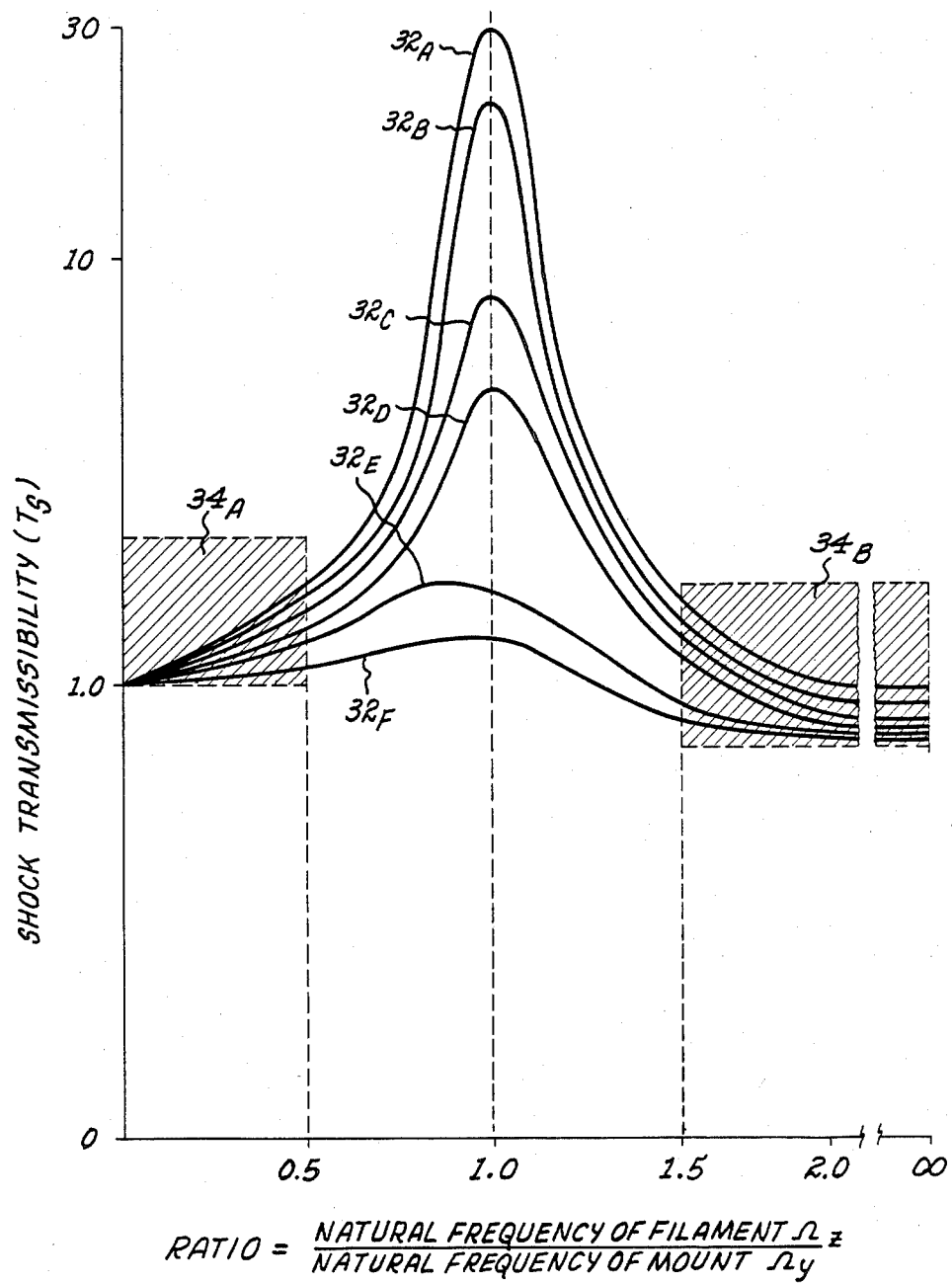
FIG. 4. illustrates plots of curves related to the selection of parameters associated with the mounting means of the present invention.

The selection of the ratio between the natural frequencies of the filament and the mount means may be described with reference to FIG. 4 derived in accordance with the practice of the present invention and showing plots $32_A$, $32_B$, $32_C$, $32_D$, $32_E$ and $32_F$. FIG. 4 has a x coordinate, shown as the ratio of the natural frequency of the filament $\Omega_z$ relative to the natural frequency of the mount $\Omega_y$, and a y coordinate given in terms of shock transmissibility $T_S$.

The shock transmissibility $T_S$ is the ratio of the maximum acceleration of the mass of the filament $m_z$ to the maximum acceleration of the same filament that would occur if the mounting assembly $\Omega_z$ were infinitely rigid. The maximum acceleration of a hot filament occurs when the velocity of the filament is zero at its maximum displacement relative to its at-rest condition before a shock is imparted to the lamp 10.

The plots $32_A \ldots 32_F$ are related to the dampening ratios associated with the mounting means of the present invention and have values given in Table 1.

TABLE 1

| | |
|---|---|
| $32_A$ | 0.005 |
| $32_B$ | 0.01 |
| $32_C$ | 0.05 |
| $32_D$ | 0.10 |
| $32_E$ | 0.50 |
| $32_F$ | 1.0 |

The dampening ratios for the mounting means is determined by the properties of the mounting means which causes the decay of oscillation initially imparted to the mounting means by a shock impact to the lamp 10.

FIG. 4 shows the peak portions of plots $32_A$, $32_B$, $32_C$, $32_D$ and $32_F$ as occurring at a ratio = $\Omega_z/\Omega_y$ of about 1 and the peak portion of plot $32_E$ occurring before but somewhat near the ratio = $\Omega_z/\Omega_y$ of about 1. FIG. 4 also shows in a hatched manner two zones $34_A$ and $34_B$ both given in terms of the ratio = $\Omega_z/\Omega_y$. Zone $34_A$ has a range of from about 0 to about 0.5 and zone $34_B$ has a range starting at about 1.5 and continuing to infinity.

During the conduct of our investigation to solve the discussed hot shock problems, it was determined that if a ratio of 0.5 (shown in FIG. 4) between the natural frequencies of the filament $\Omega_Z$ and the natural frequencies of the mount $\Omega_y$ was provided then the susceptibility of hot shock problems is substantially reduced. It was further recognized that if a ratio between 0.0 to 0.3 was provided by selecting a relatively stiff mounting means, to be described, then the occurrence of hot shock filament failures is substantially reduced or even eliminated.

Our investigation further determined that if a relatively flexible mounting means was selected so as to provide a ratio of $\Omega_z/\Omega_y$ of 1.4 of better as encompassed by zone $34_B$ then the hot shock filament problem is substantially reduced or even eliminated.

Figure 6:
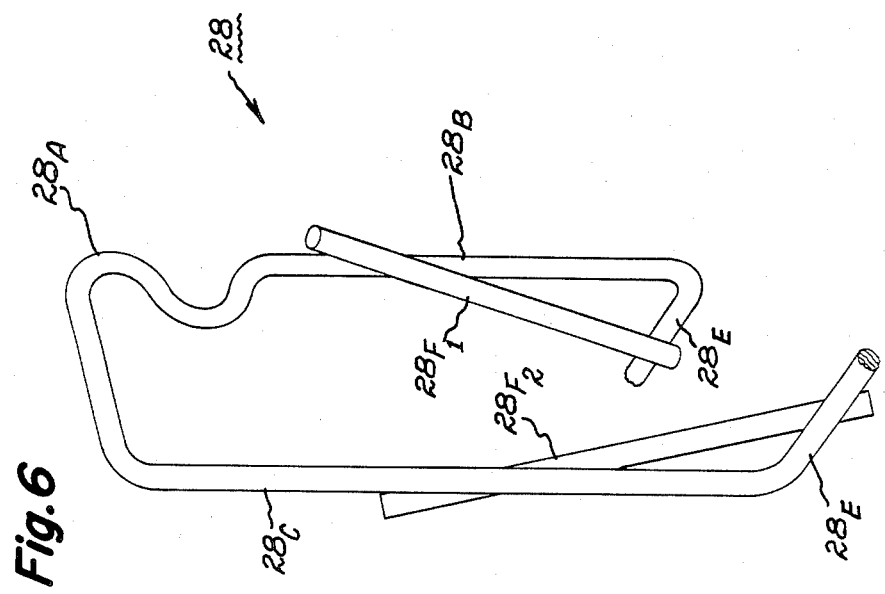
FIG. 6 illustrates another embodiment of a relatively stiff mounting means of the present invention.
Figure 5:
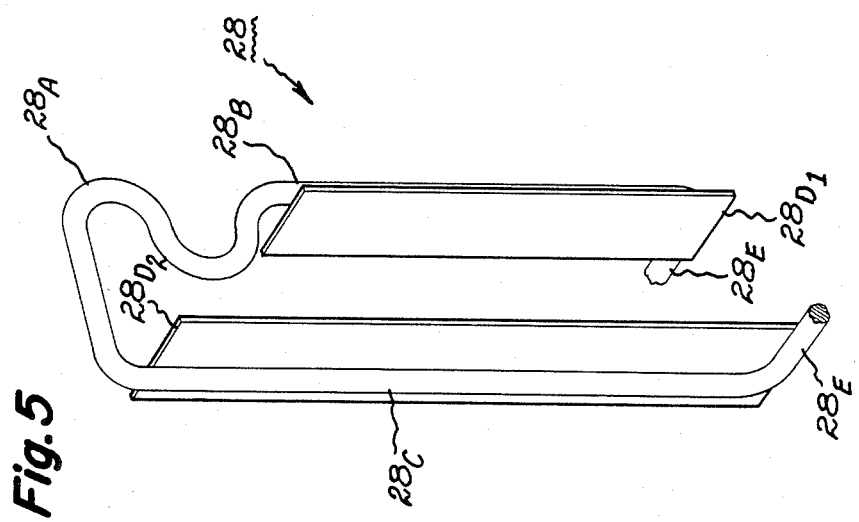
FIG. 5 illustrates one embodiment of a relatively stiff mounting means of the present invention.

Mounting arrangements that are relatively stiff so as to provide the desired lower ratios shown in FIG. 4 between the natural frequencies of the filament and the mounting means itself are shown in FIGS. 5 and 6. FIG. 5 shows a mounting arrangement 28 in which the leg portions $28_B$ and $28_C$ each have similar lower end portions $28_E$ partially shown. The leg portions $28_B$ and $28_C$ also have connected to them, by appropriate means such as, welding, longitudinal and axially extending brace members $28_{D1}$, and $28_{D2}$. The mounting arrangement 28 without the benefits of brace members $28_{D1}$, and $28_{D2}$ have natural frequency of about 40 Hz whereas, the brace members $28_{D1}$, and $28_{D2}$ increase the stiffness factor and thereby the natural frequency by a factor of about 2. The mounting means 28 of FIG. 5 by the appropriate selection of the parameters shown in Table 2 and formed of a steel material and provide for desired low ratios of $\Omega_z/\Omega_y$ also shown in Table 2.

TABLE 2

| Members | Length in inches | Thickness in inches | Ratio of $\Omega_z/\Omega_y$ |
|---|---|---|---|
| $28D_1$ | 1.0 | 0.012 | 35/88 = .40 |
| $28D_2$ | 1.0 | 0.012 | |
| $28D_1$ | 1.0 | 0.012 | 35/92 = .38 |
| $28D_2$ | 1.375 | 0.012 | |
| $28D_1$ | 1.0 | 0.024 | 35/96 = .36 |
| $28D_2$ | 1.375 | 0.024 | |
| $28D_1$ | 1.0 | 0.040 | 35/160 = .22 |
| $28D_2$ | 1.375 | 0.040 | |

For the above embodiments of Table 2, the width of the support means is about 0.125 inches, whereas the length of member $28_B$ is about 1.062 inches and the length of member $28_C$ is about 1.5 inches.

A second embodiment of the mounting arrangement 28 related to providing the low $\Omega_z/\Omega_y$ of FIG. 4 is shown in FIG. 6. The mounting arrangement of FIG. 6 is similar to the previously discussed mounting arrangement of FIG. 5 with the exception that leg portions $28_B$ and $28_C$ each respectively have a bracket members $28_{F1}$ and $28_{F2}$ which are transversely positioned across the lower end portions $28_E$ and the respective leg portions $28_B$ and $28_C$. The mounting arrangement 28 of FIG. 6 without the brace members $28_F$ have a natural frequency of about 40 Hz, whereas, the mounting arrangement 28 having the benefits of the brackets $28_F$ increase the stiffness factor and thereby the natural frequency by a value in the range of about 70. In a manner as described with regard to FIG. 5, the mounting means of FIG. 6 having the appropriate parameters of Table 3 provide for the low ratios of $\Omega_z/\Omega_y$ shown in FIG. 4.

TABLE 3

| Length $28_{F1}$ in mm | Length $28_{F2}$ in mm | Ratio of $\Omega_z/\Omega_y$ |
|---|---|---|
| 27 | 0 | 0.53 |
| 27 | 27 | 0.48 |
| 27 | 38 | 0.44 |
| 39 | 39 | 0.33 |
| 42 | 42 | 0.24 |

Figure 7:
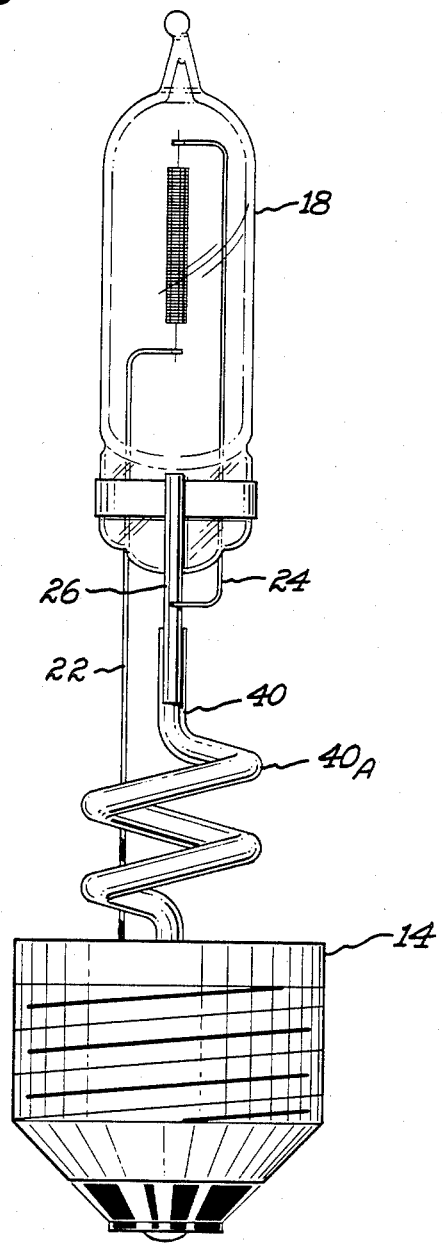
FIG. 7 illustrate a spring arrangement for mounting the inner envelope.
Figure 8:
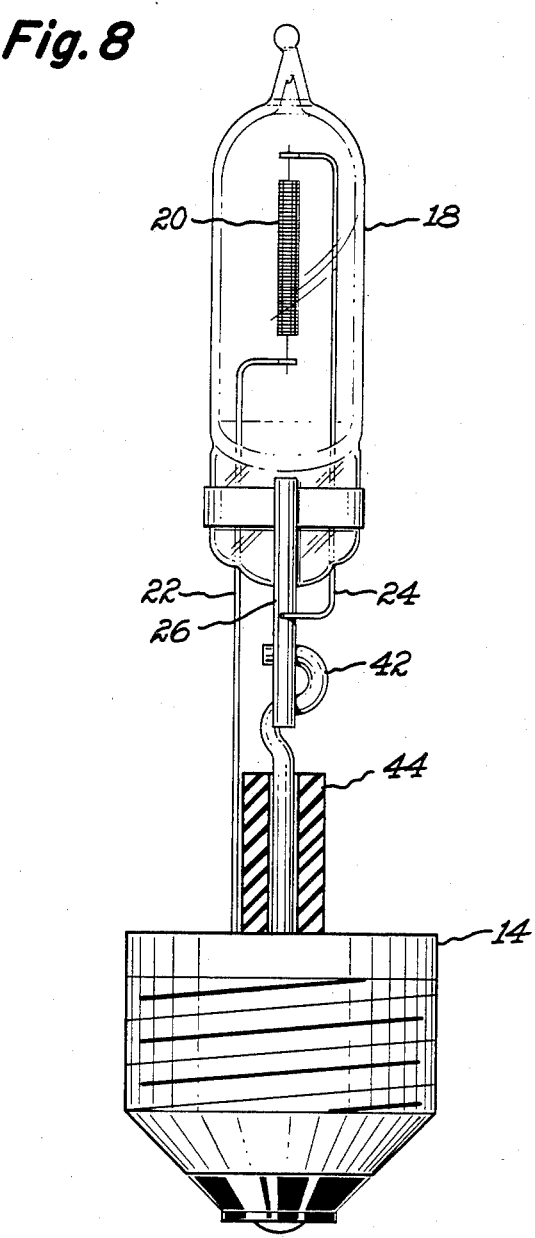
FIG. 8 illustrate a non-linear support arrangement for mounting the inner envelope.

Mounting arrangements for the inner envelope 18 that provide for the values of ratios $\Omega_z/\Omega_y$ shown in FIG. 4 are shown in FIGS. 7 and 8. FIG. 7 shows a central spring design mount 40 having an upper end welded to post 26. The mount 40 does not contact inner lead 22 and has its other end appropriately connected to base 14. The lower portion of mount 40 has a spring arrangement $40_A$. The mount 40 reduces the resonance frequency that the inner envelope may experience and correspondingly decreases the natural frequencies experienced by the filament, which, in turn increase the higher ratios $\Omega_z/\Omega_y$ to a value of 1.5 or greater. These higher ratios may be accomplished by the appropriate selection of the parameter of mount 40 given in Table 4.

TABLE 4

| Member | Length in inches | Spring Stiffness of $40_A$ | Ratio of $\Omega_z/\Omega_y$ |
|---|---|---|---|
| 40 | 1.5 | 5.44 | 1.6 |
| | 1.5 | 4.31 | 1.8 |
| | 1.5 | 3.51 | 2.0 |

In the design of low stiffness mount structures, the problem of excessive deflection of the inner envelope upon encounter a shock impact to the lamp 10 should be taken into account. If the inner envelope is displaced a sufficient amount, it may collide and contact the outer envelope 14. Collision of the inner envelope with the outer envelope may cause a strong shock to be applied directly to the inner envelope which may result in a hot shock failure of the filament. An embodiment of the present invention which solves this problem is to use a mount structure of non-linear stiffness, as shown in FIG. 8. The inner lead wire 24 is welded to a flexible central support 42 of low stiffness, by means of post 26 giving a low natural frequency to the inner envelope 18 and thus the filament 20. Surrounding the flexible central support 42 is an elastic material such as an elastomeric ring 44, which has a small radial gap between the flexible support 42 and the elastomer and allows for movement therebetween. The elastomer ring 44 is securely attached to the inner circumference of lamp outer envelope at its lower portion near base 14. When the inner envelope deflects under the influence of an external shock, the effective spring rate of the mount increases as the flexible mount 42 touches the elastomer. The rising (non-linear) spring rate of the mount structure 42 results in a gradually increasing natural frequency of the inner envelope. The frequency ratio is thus low for moderate shocks, only increasing as required to ensure that the inner envelope does not contact the lamp outer envelope. Alternatively, a metal disk attached to the center support can replace the elastomeric ring 44, so as to provide a similar non-linear spring rate. The arrangement of FIG. 8 by appropriate selection of the parameters given in Table 5 provides for the higher ratio $\Omega_z/\Omega_y$ of FIG. 4.

TABLE 5

| Members | Length in inches | Diameter in inches | Gap Between Member 42 and 44 in inches | Ratio of $\Omega_z/\Omega_y$ |
|---|---|---|---|---|
| 42 | 1.5 | 0.05 | 0.080 | 1.5 |
| 44 | 1.0 | 0.43 | | |

Figure 9:
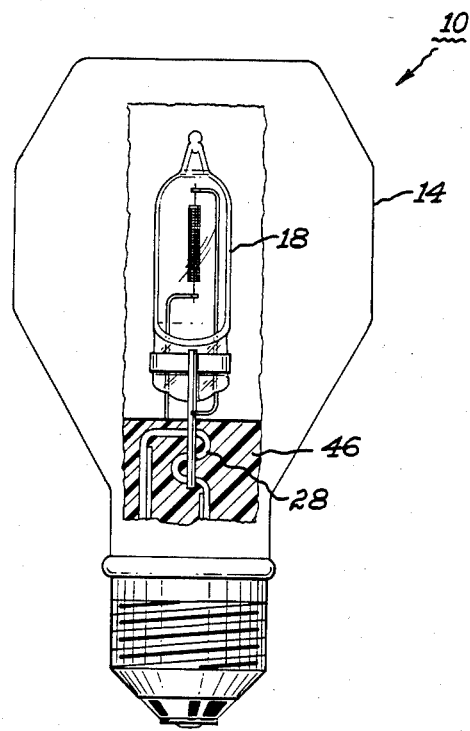
FIG. 9 shows the arrangement of inner envelope disposed within the outer envelope and provided with a stationary position by means of a rigid adhesive.

A further embodiment for arranging the inner envelope 18 within the outer envelope 14 preferably for obtaining the lower ratio $\Omega_z/\Omega_y$ of FIG. 4 is shown in FIG. 9. FIG. 9 shows the lower portion of the lamp 10 filled with a substantially non-flexible, hard adhesive or ceramic material 46, shown in a hatched arranged, which increases the stiffness of the mounting means 28 in all directions, and lower the ratio $\Omega_z/\Omega_y$. The material 46 need only surround a portion of the mounting means so as increase its overall stiffness. The magnitude of stiffness depends upon the properties of the adhesive or ceramic 46 given in Table 6 which yields the ratio $\Omega_z/\Omega_y$ also given in Table 6.

TABLE 6

| Material 46 | Ratio $\Omega_z/\Omega_y$ |
|---|---|
| Heat Cured Epoxy | 0.10 |

Figure 12:
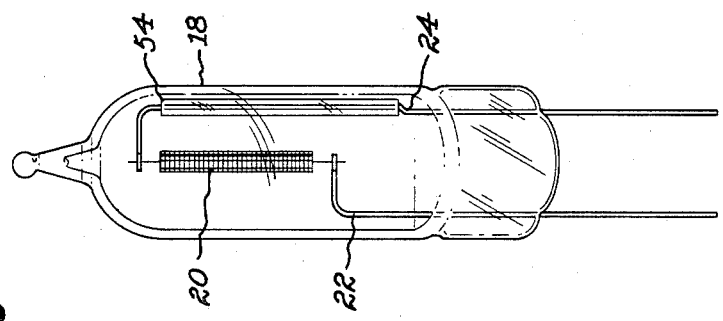
FIG. 12 illustrate means related to the inner lead of the filament for reducing the hot shock problem related to the present invention.

The hot shock problem related to the present invention may also be reduced or even corrected by the embodiments of FIGS. 10, 11 and 12 which retard or prevent the filament 20 from contacting the longer inner lead 24 within the inner envelope 18.

FIG. 10 shows a thin wire 48 attached between the mid-portion of filament 20 and the inner lead 24 by means of a glass beam 50 formed around the inner lead 24. The function of the glass bead is to attach the support wire 48 to the inner lead 24 without electrically shorting the filament 20. The function of wire 48 is to support the mid-portion of filament 20 and thereby increase its stiffness. Raising the stiffness of the filament 20 increases the natural frequency of the filament and thereby raises the ratio $\Omega_z/\Omega_y$ to a desired value.

FIG. 11 illustrates another embodiment for supporting the central or mid-portion of the filament by means of a separate member 52. The separate support member 52 is a thin wire attached to the central mid-portion of filament 20 and which is embedded in the pinch region of the inner envelope 18. The effects of such a member 52 are similar to wire 48 described with regard FIG. 10.

FIG. 12 shows an embodiment which prevents the filament 20 from being shorted to inner lead 24 so as to eliminate the hot shock problem. In such an embodiment a glass tube member is placed around the inner lead 24 thereby preventing electrical contact between lead 24 and filament 20. The embodiment of FIG. 12 provides hot-shock problems regardless of the shock impact that may be imparted to lamp 10.

Figure 13:
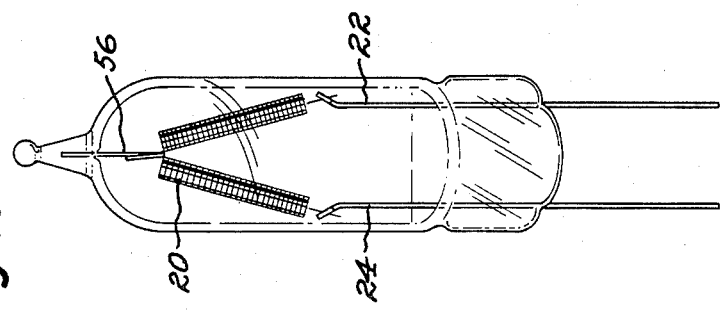
FIG. 13 shows a still further embodiment of the present invention for the support of the filament.

A further embodiment to reduce the hot shock problem by advantageously supporting the mid-portion of filament and also reducing the length of inner lead 24 is shown in FIG. 13. The filament 20 is shaped into a so-called C2R configuration having a V-type shape as shown in FIG. 13. The central or mid-portion of the filament 20 of FIG. 13 is supported by a member 56 which is embedded into the upper-most portion of the inner envelope 18 which is devoid of any inner leads extending therefrom. The orientation of the filament 20 provided by the embodiment of FIG. 13 substantially reduces the susceptibility of the lamp 10 to experience hot shock failures.

The susceptibility of the lamp 10 to hot shock problems is dependent, in part, of the orientation between the inner leads 22 and 24 and the filament 20. It has been determined that the preferred orientation is to arrange the plane between the inner leads at a position in the range of 0° to 15° to the plane of the vertical members of the mounting means such as $28_B$ and $28_C$ of FIG. 2.

It should now be appreciated that the practice of the present invention provides for various mounting arrangement of the inner envelope, various internal structures of the inner envelope and various orientation of the inner envelope all which reduces or even eliminate the hot shock problem associated with an operative filament of the general service tungsten-halogen incandescent lamp 10.

What we claim as new and desire to secure by Letters Patent of the United States is:

1. A general service tungsten-halogen incandescent lamp comprising:
   (a) an electrically conductive base;
   (b) an outer envelope having a centerline and formed of a light-transmissive material;
   (c) an inner envelope containing a fill of a halogen compound and having an axially aligned tungsten filament which is effective when operative as having a predetermined range of characteristic natural frequencies $\Omega_z$, said filament being connected between a pair of inner leads which extend out of one end of said inner envelope;
   (d) means for electrically connecting said pair of inner leads to said electrically conductive base;
   (e) mounting means, forming part of said means for electrically connecting said pair of inner leads and disposing said inner envelope within said outer envelope, said mounting means having a predetermined range of characteristic natural frequencies $\Omega_y$;
   said characteristic natural frequencies $\Omega_z$ of said operative filament and said characteristics natural frequencies $\Omega_y$ of said mounting means being interrelated by the following relationship;
   the ratio of $\Omega_z/\Omega_y$ being less than about 0.3 and greater than about 1.4.

2. A general service incandescent lamp according to claim 1 further comprises;
   a post member connected to and imposed between a loop section of said mounting means and one of said inner leads extending out of said inner envelope; and
   a strap member wrapped around the end of the inner envelope through which said pair of inner leads extend out of and to which said post member is connected.

3. A general service incandescent lamp according to claim 2 wherein said mounting means comprises;
   a wiring member having an upper portion with a loop section to which is connected said post, said loop section formed with a leg portion having means at one of its ends for appropriately connecting to said electrically conductive base, said wire member further having another leg portion having means at one of its ends for appropriately connected to said electrically conductive base; and said leg portions each having longitudinal and axially extending additional bracing members for increasing the stiffness characteristic of said mounting means.

4. A general service incandescent lamp according to claim 2 wherein said mounting means comprises;

a wiring member having an upper portion with a loop section to which is connected said post, said loop section formed with a leg portion having means at one of its ends for appropriately connecting to said electrically conductive base, said wire member further having another leg portion having means at one of its ends for appropriately connected to said electrically conductive base; and said leg portions each having an additional bracing member transversely extending between their central section and their ends connected to said conductive base for increasing the stiffness characteristic of said mounting means.

5. A general service incandescent lamp according to claim 2 wherein said mounting means comprises:

a member having one end connected to said post member, its other end appropriately connected to said electrically conductive base, and a central portion arranged as a looped spring member.

6. A general service incandescent lamp according to claim 5 wherein said spring member has a stiffness factor of about 3 to about 6.

7. A general service incandescent lamp according to claim 2 wherein said mounting means comprises:

a flexible member having one end connected to said post member and its other end appropriately connected to said electrically conductive base; and an elastic member placed about the flexible member and providing a predetermined gap between said flexible member and said elastic member and allowing for movement therebetween, said elastic material being affixed to said electrically conductive base.

8. A general service incandescent lamp according to claim 7 wherein said predetermined gap is about 0.080 inches and said elastic member is formed on a elastomeric material.

9. A general service incandescent lamp according to claim 1 further comprising a substantially non-flexible material surrounding a portion of such mounting means so as to increase the overall stiffness thereof.

10. A general service incandescent lamp according to claim 1 wherein said non-flexible material is selected from the group consisting of a heat cured epoxy, a hard adhesive and ceramic material.

11. A general service incandescent lamp according to claim 2 wherein the natural frequency of the filament is increased by an arrangement comprising;

a support member having one end connected to and insulated from one of the inner leads that runs parallel to said filament, said support member having its other end in the form of a loop which is positioned about the central portion of said filament.

12. A general service incandescent lamp according to claim 2 wherein the natural frequency of the filament is increased by an arrangement comprising;

a support member having one end embedded in the end of the inner envelope having said inleads extending therefrom, said support member having its other end in the form of a loop which is positioned about the central portion of said filament.

13. A general service incandescent lamp according to claim 2 wherein said filament is arranged into a V-shape having a central portion and a support member having one end in the form of a loop which is positioned about said central portion of said filament, said support member having its other end embedded in a top portion of said inner envelope which is devoid of inner leads extending therefrom.

14. A general service incandescent lamp according to claim 2 wherein said inner envelope further comprises an insulative member placed about one of said inner leads which runs parallel with said filament and is housed within said inner envelope.

15. A general service incandescent lamp according to claim 2 wherein the plane of the inner leads of the inner envelope are oriented in the range of 0° to 15° relative to the vertical plane of the mounting means.

* * * * *